United States Patent
Chapman et al.

(10) Patent No.: US 11,610,239 B2
(45) Date of Patent: Mar. 21, 2023

(54) MACHINE LEARNING ENABLED EVALUATION SYSTEMS AND METHODS

(71) Applicant: Disney Enterprises, Inc., Burbank, CA (US)

(72) Inventors: Steven Chapman, Burbank, CA (US); Mehul Patel, Burbank, CA (US); Joseph Popp, Burbank, CA (US); Benjamin Havey, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1233 days.

(21) Appl. No.: 15/970,809

(22) Filed: May 3, 2018

(65) Prior Publication Data

US 2019/0340659 A1 Nov. 7, 2019

(51) Int. Cl.
| | |
|---|---|
| *G06Q 30/0282* | (2023.01) |
| *G06N 20/00* | (2019.01) |
| *G06F 16/335* | (2019.01) |
| *G06F 18/40* | (2023.01) |
| *G06F 18/21* | (2023.01) |
| *G06F 3/0482* | (2013.01) |

(52) U.S. Cl.
CPC ....... *G06Q 30/0282* (2013.01); *G06F 16/337* (2019.01); *G06F 18/2178* (2023.01); *G06F 18/40* (2023.01); *G06N 20/00* (2019.01); *G06F 3/0482* (2013.01)

(58) Field of Classification Search
CPC ............... G06K 9/6263; G06N 20/00; G06Q 30/0282; G06F 16/337; G06F 18/2178; G06F 3/0482

See application file for complete search history.

(56) References Cited

U.S. PATENT DOCUMENTS

| | | | |
|---|---|---|---|
| 2011/0251988 A1* | 10/2011 | Pronk | H04N 21/4756 706/46 |
| 2012/0209832 A1* | 8/2012 | Neystadt | G06Q 50/01 707/723 |
| 2017/0061286 A1* | 3/2017 | Kumar | G06Q 30/0269 |
| 2017/0364967 A1* | 12/2017 | Parikh | G06N 20/00 |
| 2018/0210874 A1* | 7/2018 | Fuxman | G06F 40/35 |
| 2019/0005383 A1* | 1/2019 | Kantor | G06Q 30/02 |
| 2019/0205950 A1* | 7/2019 | Balasubramanian | G06Q 30/0623 |
| 2019/0251446 A1* | 8/2019 | Fang | G06N 3/0454 |

* cited by examiner

*Primary Examiner* — Tan H Tran
(74) *Attorney, Agent, or Firm* — Dorsey & Whitney LLP (57) ABSTRACT

Systems and methods for providing machine-learning enabled user-specific evaluations are disclosed. Implementations include obtaining a first set of evaluation data from a user interface, obtaining a first set of target-descriptive data including target-specific characteristics objectively describing the evaluation targets, and training, with a machine-learning algorithm, a user-specific evaluation profile indicating evaluation patterns relative to the first set of evaluation data and the first set of target-specific characteristics. Implementations include applying the user-specific evaluation profile to a second set of target-descriptive data to predict a user-specific evaluation.

18 Claims, 6 Drawing Sheets

MACHINE LEARNING ENABLED EVALUATION SYSTEMS AND METHODS

BACKGROUND

Product and service review tools, such as YELP, ROTTEN TOMATOES, AMAZON, TRIP ADVISOR, NETFLIX, and other similar review systems, provide users with aggregated review information. For example, the review system may provide an average number of "stars," points, happy faces, tomatoes, or other relative ranking indicator for all reviews submitted. The same evaluation scores and descriptions may be provided to users interested in the particular good or service being reviewed, regardless of the users' individualized preferences and tastes. For example, a user who is particular about certain types of fried chicken may perceive and review a restaurant that serves chicken differently than a user who does not like chicken, or is ambiguous to chicken. In another example involving relative price rating systems, one user might think $5 for a meal is expensive, while another user might think $5 for a meal is cheap. While some ranking systems do attempt to learn a user's overall preference and recommend products or services (such as NETFLIX), those ranking systems are generally binary or numeric (e.g., thumbs up or thumbs down, or rank on a scale of 1 to 5).

BRIEF SUMMARY OF EMBODIMENTS

According to various embodiments of the disclosed technology, systems and methods for enhancing evaluations and reviews with machine learning are described. In particular, the disclosed technology uses a machine learning algorithm to train a user-specific evaluation profile based on the user's own reviews. For example, the user may submit an initial, training set of reviews across one or more goods or services, wherein each of the goods or services corresponds to a set of characteristics (e.g., for movies, the characteristics may include movie genre, actors, director, writers, producer, set location, etc.). A user-specific evaluation profile may be trained using a machine learning algorithm based on the initial training set of reviews and the characteristics corresponding to each of the goods or services being reviewed. The user-specific evaluation profile may be applied to a subsequent target good or service to predict how the user is likely to evaluate the good or service, provide an auto-completed review, and/or provide the user with a list of other reviews from like-minded users. The system may continue to learn over time as the user submits additional reviews.

In some examples, a machine learning process may be used to predict user evaluations of particular goods or services in a background process. The machine learning algorithm may be trained on a user's evaluations and/or reviews through various systems. The machine learning algorithm may then be applied to unreviewed goods or services identified by the user to predict the review or evaluation that the user would likely apply. The system or method may compare the predicted review or evaluation to the user-generated review or evaluation, determine a discrepancy in the review, and use the discrepancy to further train the machine learning algorithm.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE EMBODIMENTS

Figure 1:
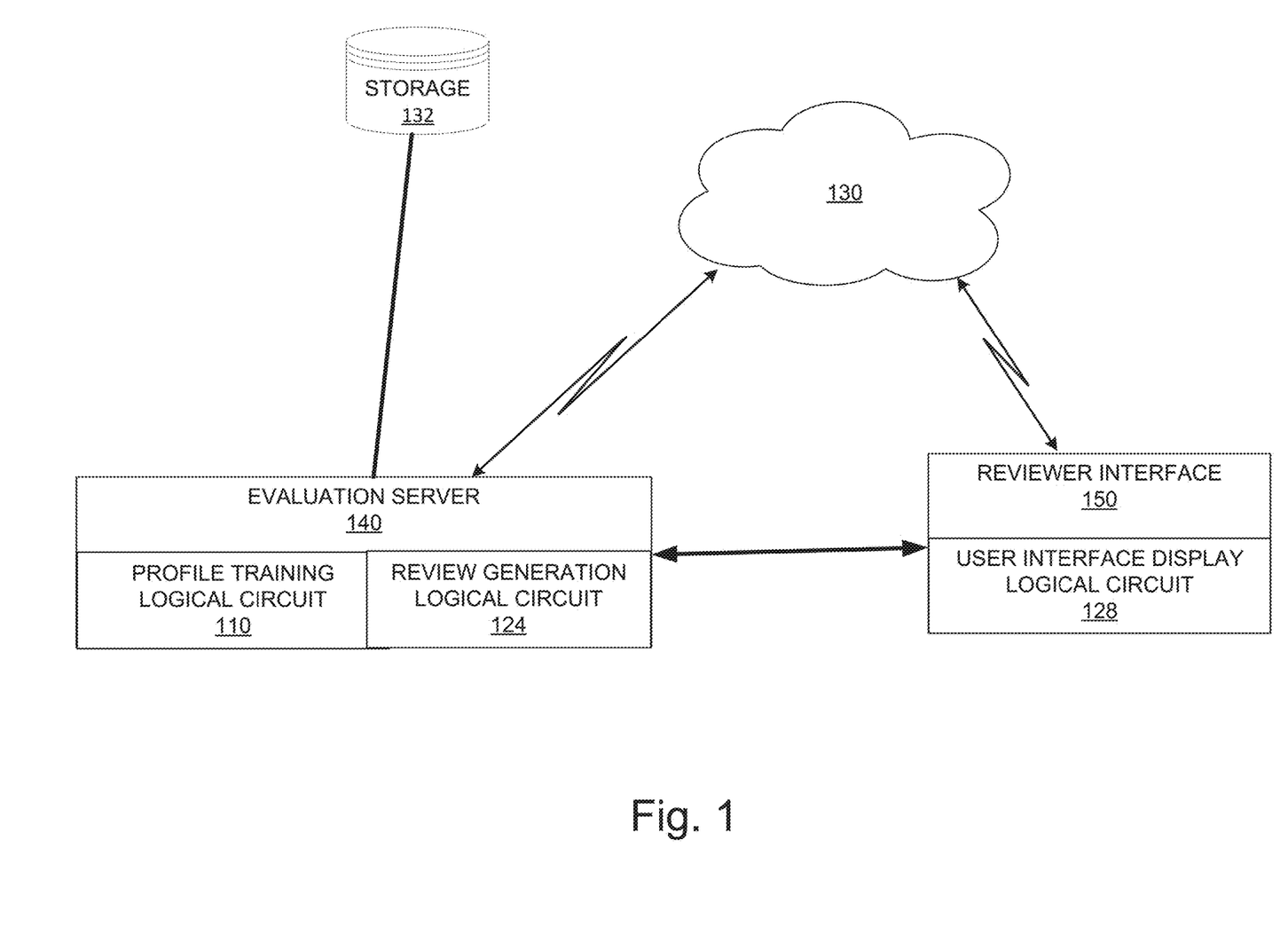
FIG. 1 illustrates a system configured for providing machine-learning enabled reviews and evaluations, in accordance with embodiments disclosed herein.

Embodiments disclosed herein relate to systems and methods for providing machine-learning enabled evaluations. FIG. 1 illustrates a system configured for providing evaluations. Referring to FIG. 1, the system may include an evaluation server 140. The evaluation server 140 may include one or more logical circuits configured to obtain a training data set and a set of target-specific characteristics. In some examples, the evaluation server 140 may include a profile training circuit 110 and a review generation logical circuit 124. For example, the profile training logical circuit 110 may use the training data set of previously created user evaluations to train a user-specific evaluation profile. In some examples, the training data set may include example standardized evaluation targets. In other examples, the training data set may include actual historic reviews for the user.

The user-specific evaluation profile may be stored in a relational database on electronic storage 132. In some embodiments, a new evaluation target may be obtained and presented to a user through reviewer interface 150. For example, user interface 150 may include a user interface display logical circuit configured to generate a graphical user interface and display the graphical user interface on a user computing device, such as a laptop, a mobile phone, a tablet computer, a netbook, a desktop computer, or other user device as known in the art. The new evaluation target may be a movie, a restaurant, a travel service, a book, a piece of music, a video game, a store, a product, an entertainment service, or other good or service as known in the art.

Evaluation server 140 may obtain the new evaluation target, and review generation logical circuit 124 may apply the user-specific evaluation profile to the new evaluation target to predict the user's evaluation of the new evaluation target. The predicted evaluation may be used to generate and display the predicted evaluation on the graphical user interface for the user to review and edit. In some examples, the predicted evaluation may be used to auto-complete the evaluation as displayed on the graphical user interface.

In some embodiments, the evaluation server 140 and reviewer interface 150 may be communicatively coupled via a wide area network, a local area network, a wireless network, a network cloud, or other communication networks as known in the art.

Figure 2:
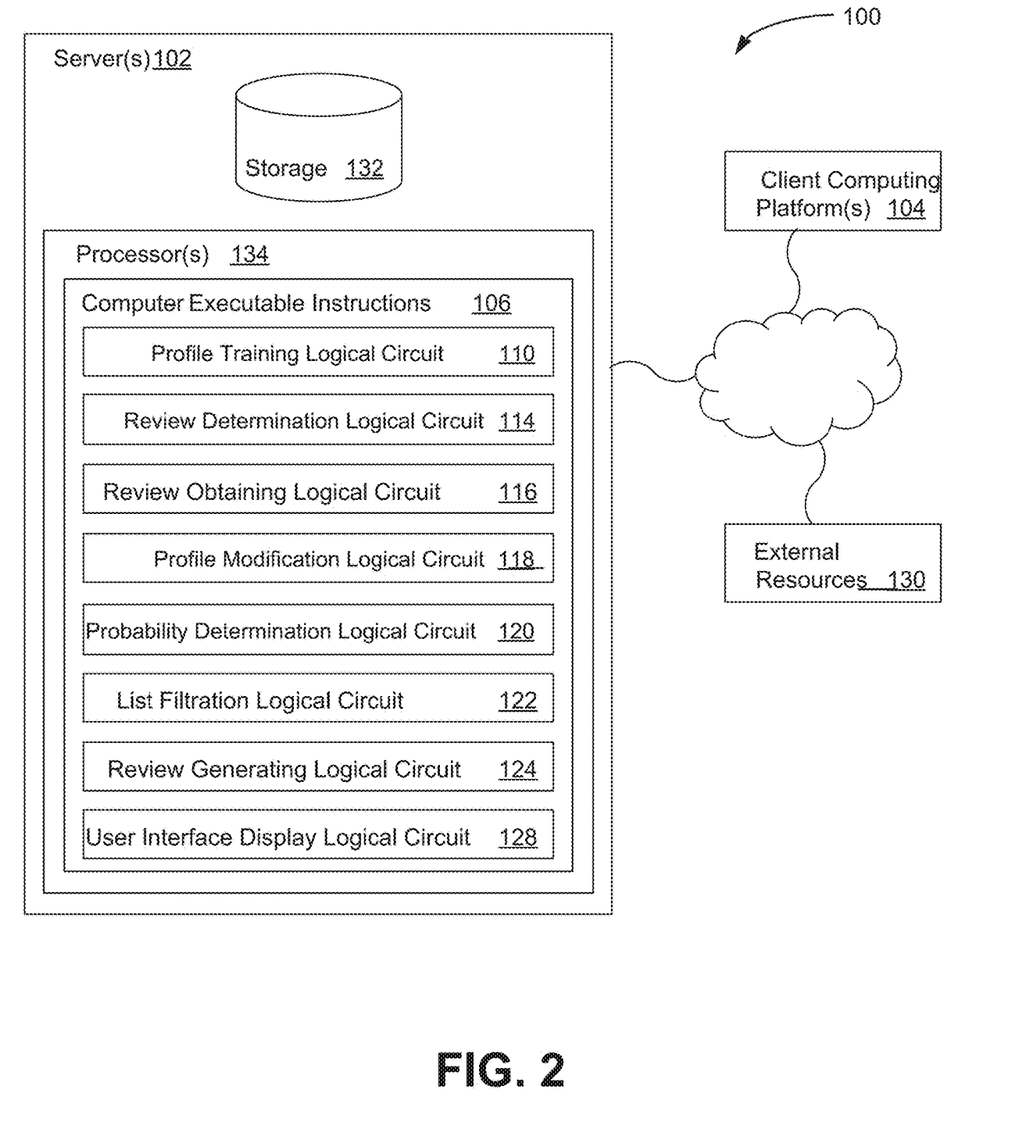
FIG. 2 illustrates a system configured for providing machine-learning enabled reviews and evaluations, in accordance with embodiments disclosed herein.

FIG. 2 illustrates a system configured for providing evaluations. As illustrated in FIG. 2, some implementations of a system 100 for providing machine learning-enabled evaluations may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

FIG. 2 illustrates a system 100 configured for providing evaluations, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by computer executable instructions 106. Server(s) 102 may include one or more logical circuits. The logical circuits may include computer program logical circuits. Some examples may include a profile training logical circuit 110, a review determination logical circuit 114, a review obtaining logical circuit 116, a profile modification logical circuit 118, a probability determination logical circuit 120, a list filtration logical circuit 122, a review generating logical circuit 124, a user interface display logical circuit 128, and/or other instruction logical circuits.

Server(s) may be configured to obtain a first set of evaluation data from a user interface. The user interface may be a program. The user interface may include a program that controls a display for the user and that allows the user to interact with the system, according to some implementations. Examples of the user interface may include one or more of command line interface, graphical user interface, and/or other user interfaces. The evaluation data may indicate qualitative descriptive feedback from a user regarding multiple initial evaluation targets.

Server(s) 102 may be configured to obtain a first set of target-descriptive data including, for each initial evaluation target, one or more target-specific characteristics objectively describing the evaluation target. For example, the first set of evaluation date may include a training set where reviews of predetermined evaluation targets are collected, or where a user is asked whether he or she agrees with pre-populated reviews. Qualitative descriptive feedback may include a string of written or audio text describing a user's impression of the evaluation target.

Profile training logical circuit 110 may be configured to train a user-specific evaluation profile indicating evaluation patterns relative to the first set of evaluation data and the first set of target-specific characteristics. By way of non-limiting example, the user-specific evaluation profile may include a convolutional neural network, a decision tree, or a linear regression model.

Profile training logical circuit 110 may be configured to obtain a review target from a review category and obtaining review target-specific characteristics objectively describing the review target. For example, the review category may be a type of thing to review, such as movies, books, restaurants, video games, travel destinations, or services. The review target may be selected from storage 132 or external resources 130 using user interface display logical circuit 128. The review target may be obtained during a user's interaction with a movie or television viewing device or software application. In some examples, the review target may be obtained through a reviewing software application or service providing application such as YELP, OPEN TABLE, HOTELS.COM, EXPEDIA, CNET, ROTTEN TOMATOES, FLIXTER, or the like. In other examples, the review target may be obtained using a location identification protocol, such as GPS, to identify a user's proximity to the review target, such as a restaurant or store.

Review determination logical circuit 114 may be configured to determine, with the user evaluation prediction logical circuit, a predicted user review of the review target by applying the user-specific evaluation profile to the review target-specific characteristics.

Review obtaining logical circuit 116 may be configured to obtain, from the user interface, a user-created review of the review target. In some examples, review determination logical circuit 114 may be configured to compare the user-created review to the predicted user review to determine a review discrepancy. In examples where the reviews or evaluations are generated quantitatively, the review discrepancy may be a quantitative difference between the predicted review and the user-generated review. In examples where the review or evaluation is qualitative or freeform, the review discrepancy may also be qualitative (e.g., text-based descriptions) or quantitative (e.g., a percentage).

Profile modification logical circuit 118 may be configured to modify the user-specific evaluation profile by applying the review discrepancy to the user-specific evaluation profile.

Probability determination logical circuit 120 may be configured to determine a probability that a user will prefer the review target as compared with other possible review targets selected from the review category. The probability may include a measure of how likely it is that the user will provide a particular qualitative or quantitative review or evaluation of the review target. In some examples, the probability may be a number expressing the ratio of favorable cases to the whole number of cases possible. Examples of the probability may include one or more of conditional probability, cross section, exceedance (e.g., the probability of exceeding a threshold value), fair chance, joint probability, risk, and/or other probabilities.

List filtration logical circuit 122 may be configured to filter a list of review targets from the review category based on the probability that the user will prefer review targets in the list. Review generating logical circuit 124 may be configured to generate a user review of the review target based on the predicted user review and display the user review on a graphical user interface. Review generating logical circuit 126 may be configured to generate an auto-completed review based on the predicted user review and display the auto-completed review on the user interface.

User interface display logical circuit 128 may be configured to generate suggested review ratings based on the predicted user review and display the suggested review ratings on the user interface. User interface display logical circuit 128 may be adapted to display predicted and/or auto-completed reviews or evaluations within third-party reviewing applications.

In some implementations, by way of non-limiting example, the initial evaluation targets may include a movie, a restaurant, a travel service, a book, a consumer product, a video game, or a personal service. Examples of the restaurant may include one or more of bistro, brasserie, brewpub, cafe, cafeteria, canteen, canteen, diner, greasy spoon, grillroom, hash house, lunchroom, rotisserie, steakhouse, teashop, and/or other restaurants. Examples of movies may include short films, feature films, television shows and movies, DVD's, online video content, user-generated content (e.g., YOUTUBE), personal videos and movies, or other multimedia content as known in the art.

In some implementations, server(s) 102, client computing platform(s) 104, and/or external resources 130 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 130 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 130, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 130 may include sources of information outside of system 100, external entities participating with system 100, and/or other resources. In some implementations, some or all of the functionality attributed herein to external resources 130 may be provided by resources included in system 100.

Server(s) 102 may include storage 132, one or more processors 134, and/or other components. Server(s) 102 may include communication lines, or ports to enable the exchange of information with a network and/or other computing platforms. Illustration of server(s) 102 in the figures are not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Storage 132 may comprise non-transitory storage media that electronically stores information. The electronic storage media of electronic storage 132 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 132 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 132 may include one or more virtual storage resources (e.g., cloud storage, a virtual private network, and/or other virtual storage resources). Electronic storage 132 may store software algorithms, information determined by processor(s) 134, information received from server(s) 102, information received from client computing platform(s) 104, and/or other information that enables server(s) 102 to function as described herein.

Processor(s) 134 may be configured to provide information processing capabilities in server(s) 102. As such, processor(s) 134 may include one or more of a digital processor, an analog processor, a digital circuit designed to process information, an analog circuit designed to process information, a state machine, and/or other mechanisms for electronically processing information. Although processor(s) 134 is shown in FIG. 2 as a single entity, this is for illustrative purposes only. In some implementations, processor(s) 134 may include a plurality of processing units. These processing units may be physically located within the same device, or processor(s) 134 may represent processing functionality of a plurality of devices operating in coordination. Processor(s) 134 may be implemented as part of logical circuits 110, 114, 116, 118, 120, 122, 124, 128, and/or other logical circuits. As used herein, the term "logical circuit" may refer to any component, module, or set of components or modules that perform the functionality attributed to the logical circuit. This may include one or more physical processors during execution of processor readable instructions, the processor readable instructions, circuitry, hardware, storage media, or any other components.

It should be appreciated that although logical circuits 110, 114, 116, 118, 120, 122, 124, and/or 128 are illustrated in FIG. 2 as being implemented with a single processing unit, in implementations in which processor(s) 134 includes multiple processing units, one or more of logical circuits 110, 114, 116, 118, 120, 122, 124, and/or 128 may be implemented remotely from the other logical circuits. The description of the functionality provided by the different logical circuits 110, 114, 116, 118, 120, 122, 124, and/or 128 described below is for illustrative purposes, and is not intended to be limiting, as any of logical circuits 110, 114, 116, 118, 120, 122, 124, and/or 128 may provide more or less functionality than is described. For example, one or more of logical circuits 110, 114, 116, 118, 120, 122, 124, and/or 128 may be eliminated, and some or all of its functionality may be provided by other ones of logical circuits 110, 114, 116, 118, 120, 122, 124, and/or 128. As another example, processor(s) 134 may be configured to execute one or more additional logical circuits that may perform some or all of the functionality attributed below to one of logical circuits 110, 114, 116, 118, 120, 122, 124, and/or 128.

Figure 3:
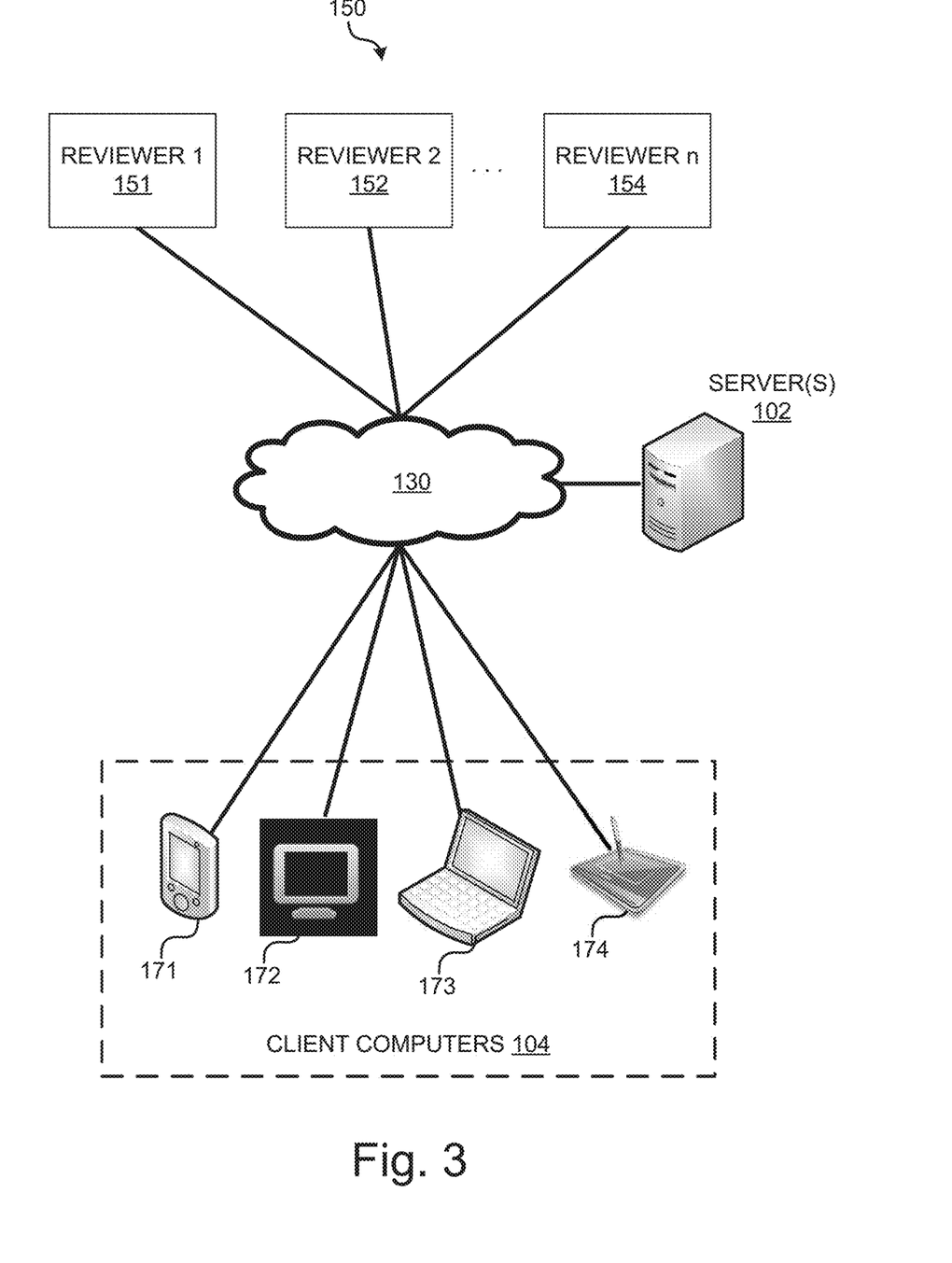
FIG. 3 illustrates a system for providing connectivity between reviewer computers and a machine-learning enabled evaluation server, in accordance with embodiments disclosed herein.

FIG. 3 illustrates a system for providing connectivity between reviewer computers and a machine-learning enabled evaluation server. Referring to FIG. 3, users may include reviewers 150 and may connect to server(s) 102 via network 130. For example, reviewers 150 may connect to server(s) 102 using downloadable or cloud-based apps, including apps configured to directly interface with server(s) 102, or third party apps or API's. The third-party apps may enable users of third-party systems, such as YELP, OPENTABLE, TRAVELOCITY, HOTELS.COM, ROTTEN TOMATOES, FLIXTER, or other service providers to submit reviews to and interact with the machine-learning enabled evaluation server(s) 102. Users may also interact directly or indirectly with server(s) 102 from client computers 104. For example, client computers 104 may include a handheld computer or smartphone 171, a desktop computer 172, a laptop computer 173, a tablet computer 174, or other computing devices as known in the art. Server(s) 102 may be configured to generate a graphical user interface and present that graphical user interface to client computers 104. Reviewers 150 may also interact with server(s) 102 via client computers 104.

Figure 4A:
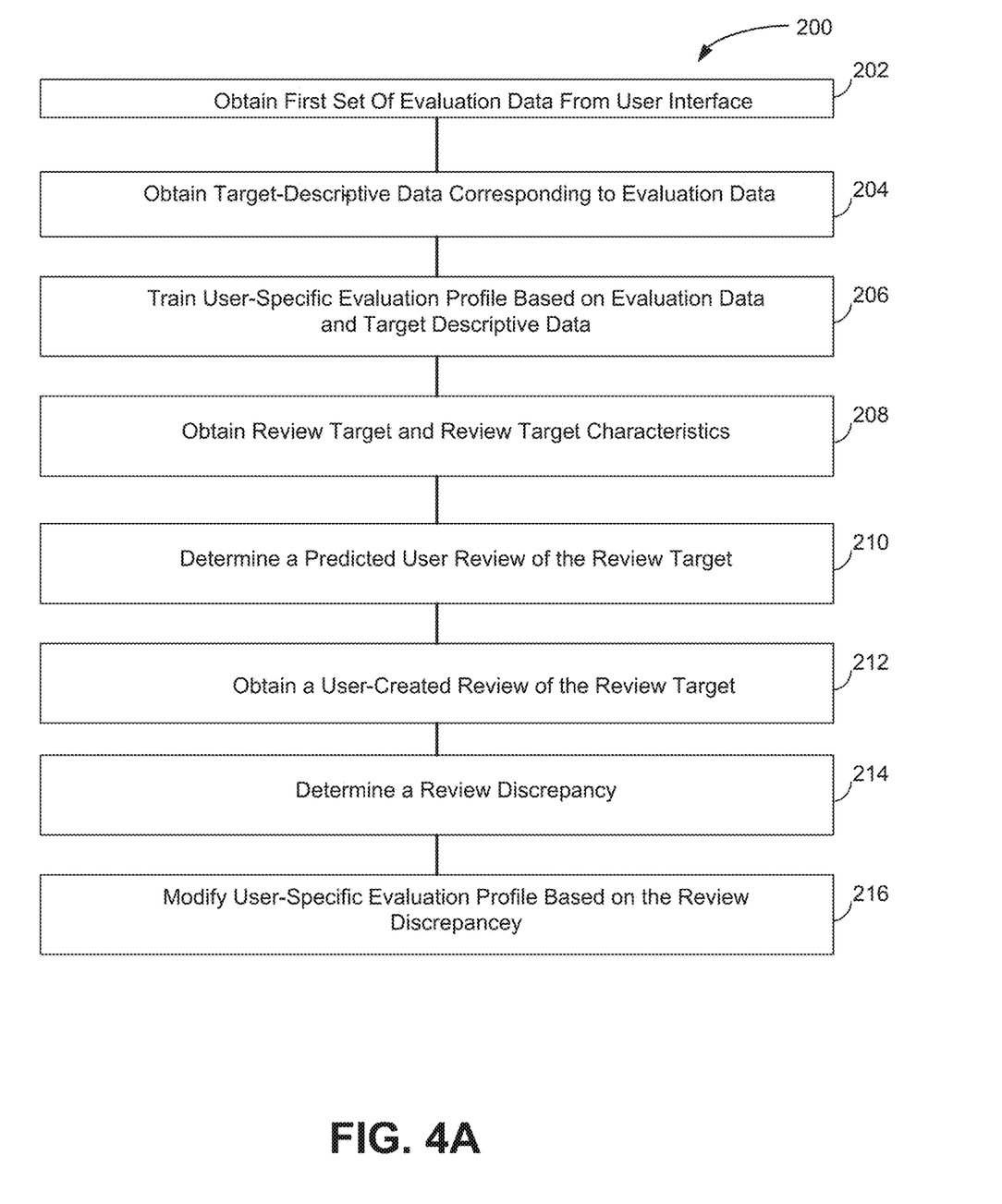
FIG. 4A illustrates a method for providing evaluations, in accordance with embodiments disclosed herein.

FIG. 4A illustrates a method 200 for providing evaluations, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 4A and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). In some examples, the processing devices may include one or more of the logical circuits described with respect to FIGS. 1 and 2 may include a processor and a non-transitory medium with computer executable instructions embedded thereon. The computer executable instructions may be configured to cause the processor to perform one or more of the operations described below with respect to FIGS. 4A and 4B.

The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include obtaining a first set of evaluation data from a user interface. The evaluation data may indicate qualitative descriptive feedback from a user regarding multiple initial evaluation targets. In some examples, multiple evaluation data sets may be obtained from multiple reviewers 150, such that server(s) 102 may be trained on multiple user profiles and preferences. Each reviewer profile may be stored in a relational database. Example user profiles and example reviews and evaluations for each user profile may be stored and correlated to enable the system to determine new user profiles based on a subset of initial training data (e.g., a set of initial reviews submitted by the new user as correlated with existing or known user profiles). The user-specific profiles may then be modified over time as the training process continues.

Operation 202 may be performed by one or more hardware processors configured by computer executable instructions including a logical circuit that is the same as or similar to profile training logical circuit 110, in accordance with one or more implementations.

An operation 204 may include obtaining a first set of target-descriptive data including, for each initial evaluation target, one or more target-specific characteristics objectively describing the evaluation target. Operation 204 may be performed by one or more hardware processors configured by computer-executable instructions including a logical circuit that is the same as or similar to profile training logical circuit 110, in accordance with one or more implementations.

An operation 206 may include training, with a user evaluation profiling logical circuit, a user-specific evaluation profile indicating evaluation patterns relative to the first set of evaluation data and the first set of target-specific characteristics. Operation 206 may be performed by one or more hardware processors configured by computer executable instructions including a logical circuit that is the same as or similar to profile training logical circuit 110, in accordance with one or more implementations.

In some examples, method 200 may include obtaining a review target and review target characteristics at step 208. The method may also include determining a predicted user review of the review target at step 210. For example, operation 210 may be performed by one or more hardware processors configured by computer executable instructions including a logical circuit that is the same as or similar to review determination logical circuit 114, in accordance with one or more implementations.

In some examples, method 200 may include obtaining a user-created review of the review target at step 212. For example, the user-created review may be obtained from client computers 104 and/or from one or more reviewers 150. Method 200 may also include determining a review discrepancy at step 214 as a difference between the user-created review and the predicted review. Method 200 may also include modifying the user-specific evaluation profile based on the review discrepancy (e.g., continuing to train and refine the user-specific evaluation profile).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Figure 4B:
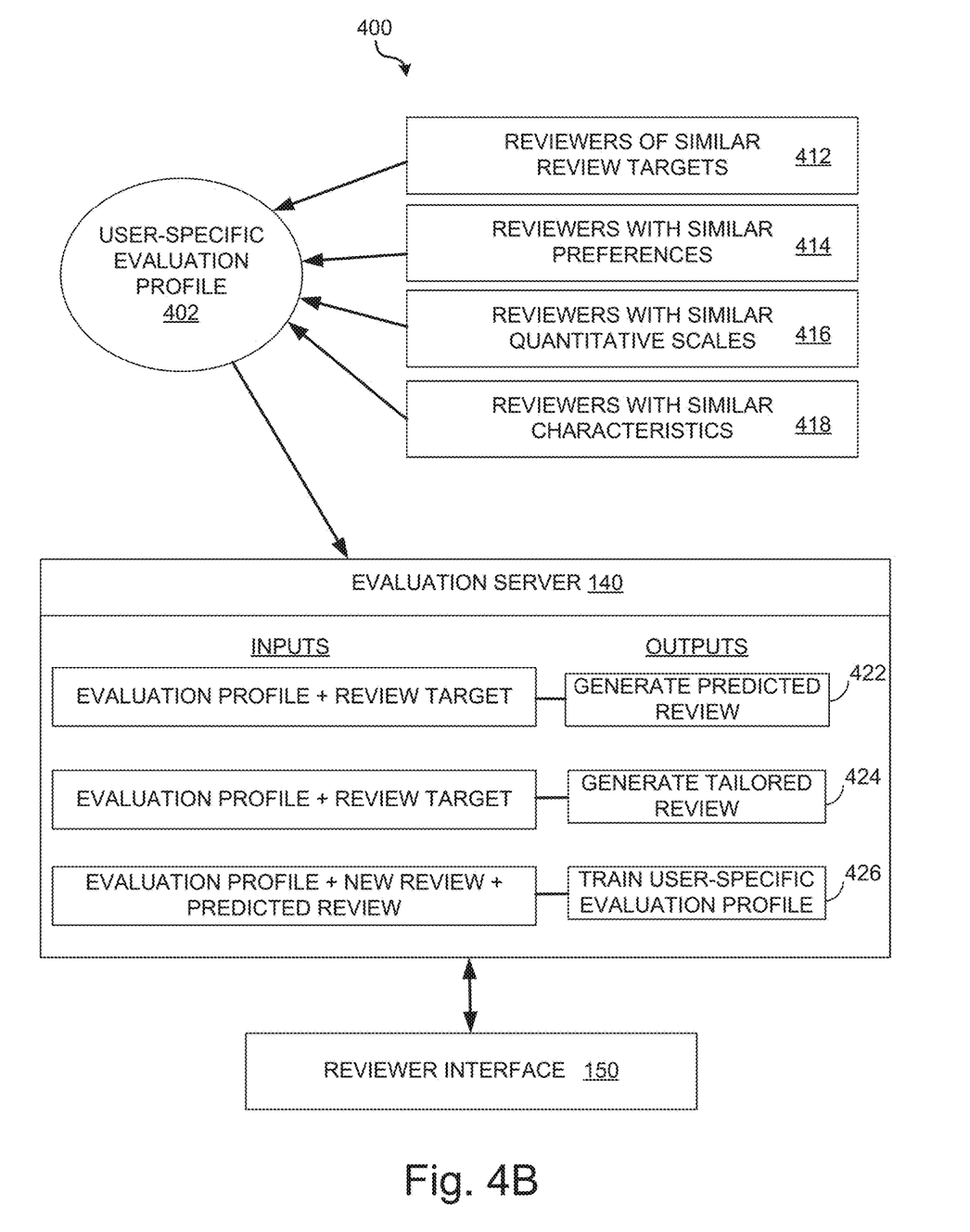
FIG. 4B illustrates a system configured for providing machine-learning enabled reviews and evaluations, in accordance with embodiments disclosed herein.

FIG. 4B illustrates a system configured for providing machine-learning enabled reviews and evaluations. In some examples, systems and methods for generating, training, modifying, and/or applying a user-specific evaluation profile 402 may be implemented in accordance with embodiments disclosed herein. In some examples, a user-specific evaluation profile 402 may include a machine-learning model trained using a training data set. The training data set may include reviews obtained from reviewers of similar review targets in operation 412. For example, similar review targets may be selected from the same target category and/or may share other target-specific characteristics.

The training data set may include reviews obtained from reviewers with similar preferences as a particular user in operation 414. For example, the training data set reviewers and the target user may share similar tastes or preferences, or may have otherwise reviewed similar review targets in a similar manner.

The training data set may include reviews obtained from reviewers with similar quantitative scales as a particular user in operation 416. The training data set may include reviews from reviewers with similar characteristics in operation 418. One or more of the reviews indicated in operations 412, 414, 416, and/or 418 may be incorporated, alone or in combination, to build the training data set used to train user-specific evaluation profile 402.

Evaluation server 140 may generate, train, modify, and/or apply user-specific evaluation profile 402. In operation 422, evaluation server 140 may obtain user-specific evaluation profile 402 and apply it to a review target to generate a predicted review. In operation 424, evaluation server 140 may obtain user-specific evaluation profile 402 and apply it to a review target to generate a tailored review, e.g., by auto-completing answers to review questions based on a predicted review. The tailored review may be presented to the user through reviewer interface 150. In operation 426, evaluation server 140 may obtain user-specific evaluation profile 402 and apply it to a review target to generate a predicted review, and compare the predicted review with a new review obtained from reviewer interface 150 to determine a review discrepancy as a difference between the predicted review and new review. The review discrepancy may be used by evaluation server 140 to modify and/or train user-specific evaluation profile 402.

In some examples, operation 424 may include generating a list of multiple reviews that relevant to the user-specific evaluation profile 402. For example, operation 424 may include identifying and filtering relevant reviews based on the user-specific evaluation profile to present a list of reviews that from reviewers with similar preferences to the user, e.g., having similar tastes in food, pricing, movies, books, other topics relating to the particular review target.

Figure 5:
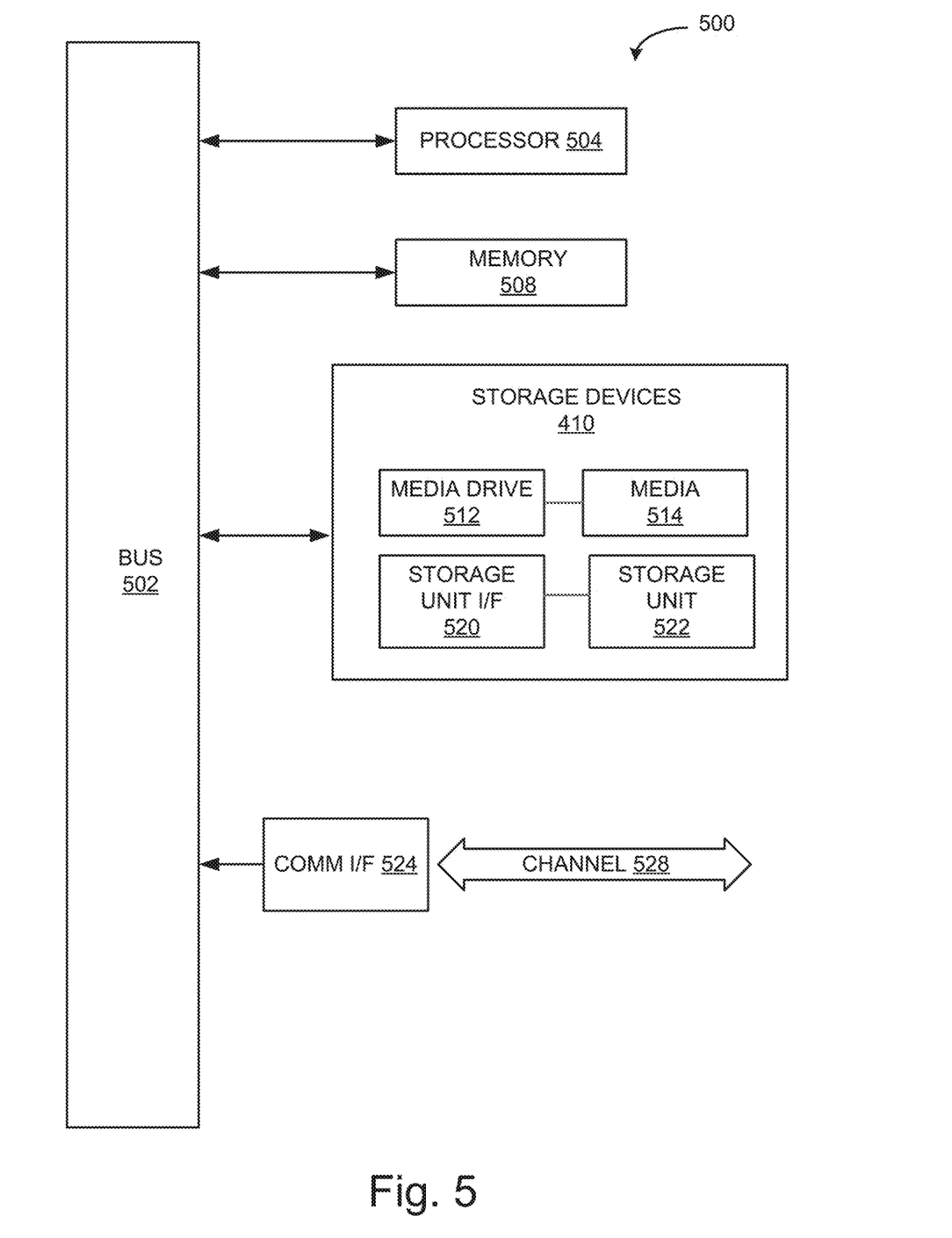
FIG. 5 illustrates an example computing component that may be used in implementing various features of embodiments of the disclosed technology.

As used herein, the term component might describe a given unit of functionality that can be performed in accordance with one or more embodiments of the technology disclosed herein. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. In implementation, the various components described herein might be implemented as discrete components or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. As used herein, the term engine may describe a collection of components configured to perform one or more specific tasks. Even though various features or elements of functionality may be individually described or claimed as separate components or engines, one of ordinary skill in the art will understand that these features and functionality can be shared among one or more common software and hardware elements, and such description shall not require or imply that separate hardware or software components are used to implement such features or functionality.

Where logical circuits, modules, engines, components, or components of the technology are implemented in whole or in part using software, in one embodiment, these software elements can be implemented to operate with a computing or processing component capable of carrying out the functionality described with respect thereto. One such example computing component is shown in FIG. 5. Various embodiments are described in terms of this example-computing component 500. After reading this description, it will become apparent to a person skilled in the relevant art how to implement the technology using other computing components or architectures.

Referring now to FIG. 5, computing component 500 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing component 800 might also represent computing capabilities embedded within or otherwise available to a given device. For example, a computing component might be found in other electronic devices such as, for example, digital cameras, navigation systems, cellular telephones, portable computing devices, modems, routers, WAPs, terminals and other electronic devices that might include some form of processing capability.

Computing component 500 might include, for example, one or more processors, controllers, control components, or other processing devices, such as a processor 504. Processor 504 might be implemented using a general-purpose or special-purpose processing engine such as, for example, a microprocessor, controller, or other control logic. In the illustrated example, processor 504 is connected to a bus 502, although any communication medium can be used to facilitate interaction with other components of computing component 500 or to communicate externally.

Computing component 500 might also include one or more memory components, simply referred to herein as main memory 508. For example, preferably random access memory (RAM) or other dynamic memory might be used for storing information and instructions to be executed by processor 504. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 804.

The computing component 500 might also include one or more various forms of information storage device 510, which might include, for example, a media drive 512 and a storage unit interface 520. The media drive 512 might include a drive or other mechanism to support fixed or removable storage media 514. For example, a hard disk drive, a floppy disk drive, a magnetic tape drive, an optical disk drive, a CD or DVD drive (R or RW), or other removable or fixed media drive might be provided. Accordingly, storage media 514 might include, for example, a hard disk, a floppy disk, magnetic tape, cartridge, optical disk, a CD or DVD, or other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot, a PCMCIA slot and card, and other fixed or removable storage units 522 and interfaces 520 that allow software and data to be transferred from the storage unit 522 to computing component 800.

Computing component 500 might also include a communications interface 524. Communications interface 524 might be used to allow software and data to be transferred between computing component 500 and external devices. Examples of communications interface 524 might include a modem or softmodem, a network interface (such as an Ethernet, network interface card, WiMedia, IEEE 802.XX, or other interface), a communications port (such as for example, a USB port, IR port, RS232 port, Bluetooth® interface, or other port), or other communications interface. Software and data transferred via communications interface 824 might typically be carried on signals, which can be electronic, electromagnetic (which includes optical) or other signals capable of being exchanged by a given communications interface 524. These signals might be provided to communications interface 524 via a channel 528. This channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent component names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the components or functionality described or claimed as part of the component are all configured in a common package. Indeed, any or all of the various components of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer implemented method of providing evaluations, the method comprising:
   obtaining a first set of evaluation data indicating qualitative descriptive feedback from a first user regarding one or more initial evaluation targets;
   obtaining a first set of target-descriptive data comprising, for each initial evaluation target, one or more target-specific characteristics objectively describing the initial evaluation target;
   training, with a user evaluation profiling logical circuit, a user-specific evaluation profile model indicating evaluation patterns relative to the first set of evaluation data and the one or more target-specific characteristics;
   predicting, using the user-specific evaluation profile model, a user review for a review target from a review category;
   receiving a second set of evaluation data for a second evaluation target, the second set of evaluation data corresponding to one or more users different from the first user;
   filtering the second set of evaluation data based at least in part on the predicted user review to generate a filtered set of second evaluation data, wherein the filtering comprises:
      determining a first probability that the one or more users different from the first user will prefer the review target as compared with other possible review targets from the review category;
      determining a second probability that the one or more users different from the first user will prefer the other possible review targets from the review category; and
      filtering a list of the other possible review targets based on the second probability that the one or more users different from the first user will prefer the other possible review targets in the list; and
   displaying information based at least in part on the filtered set of second evaluation data.

2. The computer-implemented method of claim 1, further comprising
   obtaining the review target from the review category and review target-specific characteristics objectively describing the review target.

3. The computer-implemented method of claim 1, further comprising obtaining, from the user interface, a user-created review of the review target and comparing the user-created review to the predicted user review to determine a review discrepancy.

4. The computer-implemented method of claim 3, further comprising modifying the user-specific evaluation profile model by applying, with the user evaluation profiling logical circuit, the review discrepancy to the user-specific evaluation profile model.

5. The computer-implemented method of claim 1, further comprising generating a user review of the review target based on the predicted user review.

6. The computer-implemented method of claim 1, wherein the initial evaluation targets comprise a movie, a restaurant, a travel service, a book, a consumer product, a video game, a personal service, or a combination thereof.

7. The computer-implemented method of claim 1, wherein the review category comprises movies, restaurants, travel services, books, consumer products, video games, or personal services.

8. The computer-implemented method of claim 1, wherein the user-specific evaluation profile model comprises a convolutional neural network, a decision tree, or a linear regression model.

9. The method of claim 1, wherein the filtered second set of evaluation data is based at least in part on one or more similar preferences, by the one or more users different from the first user, as the first user.

10. The method claim 1, wherein the one or more target-specific characteristics objectively describing the initial evaluation target comprise a general review category, a target location, a target proximity to the first user, a medium of discovery of the initial evaluation target, or a combination thereof.

11. An evaluation system comprising:
    a user interface, a data store, and a user evaluation profiling logical circuit, the user evaluation prediction logical circuit comprising a processor and a non-transitory medium with computer executable instructions embedded thereon, the computer executable instructions configured to:
    obtain a first set of evaluation data indicating qualitative descriptive feedback from a first user regarding one or more initial evaluation targets;
    obtain a first set of target-descriptive data comprising, for each initial evaluation target, one or more target-specific characteristics objectively describing the initial evaluation target;
    train, with the user evaluation profiling logical circuit, a user-specific evaluation profile model indicating evaluation patterns relative to the first set of evaluation data and one or more target-specific characteristics;
    predict, using the user-specific evaluation profile model, a user review for a review target from a review category;
    receive a second set of evaluation data for a second evaluation target, the second set of evaluation data corresponding to one or more users different from the first user;
    filter the second set of evaluation data based at least in part on the predicted user review to generate a filtered set of second evaluation data, wherein the computer executable instructions performing the filtering are configured to:
       determine a first probability that the one or more users different from the first user will prefer the review target as compared with other possible review targets from the review category;
       determine a second probability that the one or more users different from the first user will prefer the other possible review targets from the review category; and
       filter a list of the other possible review targets based on the second probability that the one or more users different from the first user will prefer the other possible review targets in the list; and
    display information based at least in part on the filtered set of second evaluation data.

12. The system of claim 11, wherein the computer executable instructions are further configured to cause the processor to:
    obtain the review target from the review category and review target-specific characteristics objectively describing the review target.

13. The system of claim 11, wherein the computer executable instructions are further configured to cause the processor to obtain, from the user interface, a user-created review of the review target and compare the user-created review to the predicted user review to determine a review discrepancy.

14. The system of claim 13, wherein the computer executable instructions are further configured to cause the processor to modify the user-specific evaluation profile model by applying the review discrepancy to the user-specific evaluation profile model.

15. The system of claim 11, wherein the computer executable instructions are further configured to cause the processor to generate a user review of the review target based on the predicted user review.

16. The system of claim 11, wherein the initial evaluation targets comprise a movie, a restaurant, a travel service, a book, a consumer product, a video game, a personal service, or a combination thereof.

17. The system of claim 11, wherein the review category comprises movies, restaurants, travel services, books, consumer products, video games, personal services, or a combination thereof.

18. The system of claim 11, wherein the user-specific evaluation profile model comprises a convolutional neural network, a decision tree, or a linear regression model.

\* \* \* \* \*